United States Patent [19]

Droegemueller et al.

[11] Patent Number: 5,066,092
[45] Date of Patent: Nov. 19, 1991

[54] OPTICAL ARRANGEMENT FOR A FEEDBACK-FREE COUPLING OF A LASER EMISSION EMITTED BY A SEMICONDUCTOR LASER INTO AN OPTICAL FIBER

[75] Inventors: Karsten Droegemueller, Feldkirchen-Westerham; Ekkehard Klement, Graefelfing, both of Fed. Rep. of Germany

[73] Assignee: Siemens Aktiengesellschaft, Munich, Fed. Rep. of Germany

[21] Appl. No.: 578,418

[22] Filed: Sep. 6, 1990

[30] Foreign Application Priority Data

Sep. 20, 1989 [DE] Fed. Rep. of Germany ....... 3931380

[51] Int. Cl.$^5$ .............................................. G02B 6/36
[52] U.S. Cl. ......................................... 385/33; 385/31
[58] Field of Search ............... 350/96.15, 96.17, 96.18, 350/96.20, 376; 250/227.14, 227.15, 227.17, 227.24, 552; 357/17, 19, 30, 74, 80

[56] References Cited

U.S. PATENT DOCUMENTS

| | | | |
|---|---|---|---|
| 4,475,788 | 10/1984 | Tomassini et al. | 350/96.20 |
| 4,705,351 | 11/1987 | Toda | 350/96.20 X |
| 4,753,521 | 6/1988 | Deserno | 350/96.18 X |
| 4,767,171 | 8/1988 | Keil et al. | 350/96.18 |
| 4,966,444 | 10/1990 | Droegemueller et al. | 350/376 |

FOREIGN PATENT DOCUMENTS 0275068 7/1988 European Pat. Off. .

OTHER PUBLICATIONS

Tkach et al., "Linewidth Broadening and Mode Splitting Due to Weak Feedback in Single-Frequency 1.5-μm Lasers", Conf. on Fiber Comm. (OFC) '86, Atlanta, M15, pp. 18, 19.
Shirasaki et al., "Optical Isolator for Single Mode Fiber", *European Conference on Optical Communications (ECOC)*, '86, Barcelona, 1986, vol. II, pp. 11–16.
Chikama et al., "An Optical FSK Transmission Experiment Using Solitary DFB Lasers for Broad-Band Distribution Networks", *European Conference on Optical Communications (ECOC)* '87, vol. 1, pp. 349–352.
Drögemüller "A Novel Compact Optical Isolator for Laser-to-Fiber Coupling with Low Optical Feedback", *European Conference on Optical Communications (ECOC)* '87, vol. I, pp. 271–274.
Tkach et al., "Regimes of Feedback Effects in 1.5-μm Distributed Feedback Lasers", *Journal of Lightwave Technology*, vol. LT-4, No. 11, Nov. 1986, pp. 1655–1661.
Kawano et al., "A New Confocal Combination Lens Method for a Laser-Diode Module Using a Single-Mode Fiber", *Journal of Lightwave Technology*, vol. LT-3, No. 4, Aug. 1985, pp. 739–745.

*Primary Examiner*—William L. Sikes
*Assistant Examiner*—Phan T. Heartney
*Attorney, Agent, or Firm*—Hill, Van Santen, Steadman & Simpson

[57] ABSTRACT

An optical arrangement for the feedback-free coupling of the laser emission emitted by a semiconductor laser into an optical fiber, characterized by a first optical lens for receiving the output of the semiconductor laser, a first optical isolator composed of a Faraday rotator and a polarizer following in the propagation direction of the laser emission, a second optical isolator being composed of a second Faraday rotator and a second polarizer that has a higher blocking attenuation compared to the blocking attenuation of the first polarizer being arranged between the first lens and the optical isolator. In order to use the optical arrangement in an optical heterodyne system, the blocking attenuation of at least −70 dB is obtainable in this arrangement.

6 Claims, 1 Drawing Sheet

OPTICAL ARRANGEMENT FOR A FEEDBACK-FREE COUPLING OF A LASER EMISSION EMITTED BY A SEMICONDUCTOR LASER INTO AN OPTICAL FIBER

BACKGROUND OF THE INVENTION

The present invention is directed to an optical arrangement for the feedback-free coupling of a laser emission emitted by a semiconductor laser into an optical fiber. The arrangement includes a first optical lens and a second optical lens arranged following the first optical lens in a propagation direction of the emission, as well as an optical isolator being arranged in the beam path of the laser emission, the optical isolator being composed of a Faraday rotator and at least one polarizer, whereby the second lens is a component part of the Faraday rotator.

U.S. Pat. No. 4,966,444) application Ser. No. 07/137,080, filed Dec. 23, 1987), whose disclosure is incorporated herewithin by reference thereto and which corresponds to European EP 02 75 068 A2, discloses a feedback-free coupling arrangement for coupling a laser emission, which is emitted by a semiconductor laser, into an optical fiber. A blocking attenuation of approximately $-35$ dB can be achieved with this arrangement. Optical transmission systems that operate according to the heterodyne system require extremely monochromatic and frequency-stable laser transmitters and local oscillators. Lasers, whose spectral line is broadened due to feedback, cannot be utilized for this purpose (in this respect see a paper by R. W. Tkack and A. R. Chraplyvy "Linewidth broadening and mode splitting due to weak feedback in single-frequency 1.5 $\mu$m lasers", *Conf. on Fiber Comm. (OFC)* '86, Atlanta, MI5; a paper by M. Shirasaki et al, "Optical Isolator for Single-Mode Fiber", *European Conf. on Optical Comm. (ECOC)* '86, Barcelona 1986, Vol. II, pp. 11–16; and a paper by T. Chikama, H. Onaka, T. Kiyonaga, M. Suyama and H. Kuwahara, "An Optical FSK Transmission Experiment Using Solitary DFB Lasers for Broad-Band Distributed Networks", *European Conf. on Optical Comm. (ECOC)* '87, Vol. I, page 349, September 1987). A suppression of the feedback and, thus, a blocking attenuation of at least $-70$ dB is required here.

SUMMARY OF THE INVENTION

The object of the present invention is to provide an optical arrangement for the feedback coupling of the laser emission emitted by a semiconductor laser into an optical fiber with which a blocking attenuation of at least $-70$ dB can be achieved.

This object is achieved with an improvement in an optical arrangement for the feedback-free coupling of the laser emission divergingly emitted by a semiconductor laser into an optical fiber, particularly a single-mode fiber, wherein the arrangement includes a first optical lens for receiving the laser emission, a second optical lens arranged following the first optical lens in a propagation direction of the emission, and an optical isolator being arranged in the beam path of the laser emission, said isolator being composed of a Faraday rotator and at least one polarizer, and wherein the second lens is a component part of the Faraday rotator. The improvements are that a second optical isolator is arranged between the first lens and the first-mentioned optical isolator, said second optical isolator being composed of a second Faraday rotator and of a second polarizer that has a higher blocking attenuation when compared to the blocking attenuation of the first-mentioned polarizer.

The arrangement of the present invention is very advantageously created in a simple and compact double-isolator having an extremely short structural length that can be integrated in a semiconductor laser module and can be utilized for optical heterodyne systems.

Let it be pointed out that M. Shirasaki et al "Optical Isolators for Single-Mode Fibers", *European Conference on Optical Communications (ECOC)*, 1986, Barcelona, 1986, Vol. II, pp. 11–16, discloses a double isolator to be arranged between two fiber ends. This double isolator being composed of two series-connected optical isolators. Each of these isolators is composed of a Faraday rotator and two optical polarizers in the form of birefringent camera wedges that are arranged relative to one another so that the angular deflection that a proper ray experiences in transmission due to refraction at the first wedge is compensated by the second wedge.

By comparison thereto, the arrangement of the present invention requires only two polarizers, wherein the second polarizer is arranged closer to the semiconductor laser but must have a higher blocking attenuation than the first polarizer for which a blocking attenuation suffices that requires a traditional arrangement having only one optical isolator.

In an advantageous development of the inventive arrangement, a third optical lens is fashioned in the second Faraday rotator. This third optical lens is preferably a plano-convex lens. This design establishes a three-lens coupling optic that allows greater adjustment tolerances of the individual components with respect to the coupling efficiency and enables a simple fabrication assembly of the module.

It is also advantageous in the arrangement of the invention when the second polarizer is composed of a wedge of a birefringent material. This wedge guarantees a high blocking attenuation, is simple to manufacture and is extremely compact. In fact, this wedge produces an angular error of this light due to the refraction of the transmitted light and this error, however, can be advantageously completely compensated by an adjustment of the fiber to be connected. An additional coupling loss between laser and fiber is, thus, avoided. Due to the readjustment of the fiber, a further wedge that would have compensated the angular error can be omitted or eliminated. The cost for the polarizers are, thus, minimized.

Other advantages and features of the invention will be readily apparent from the following description of the preferred embodiments, the drawings and claims.

DESCRIPTION OF THE PREFERRED EMBODIMENTS

Figure 1:
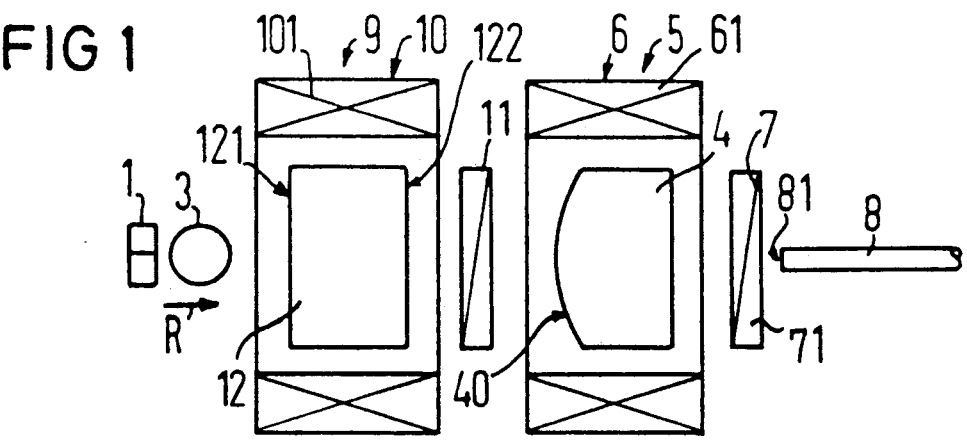
FIG. 1 is a schematic view of an arrangement according to the present invention having a two-lens coupling optics.
Figure 2:
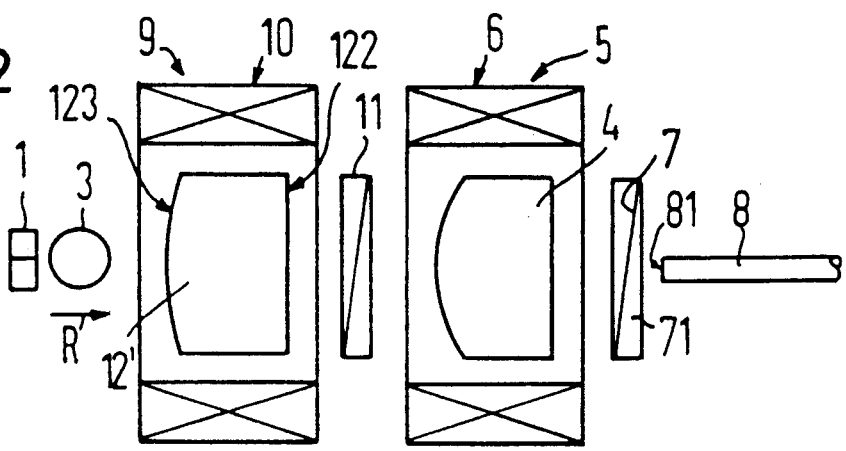
FIG. 2 is a schematic view of the arrangement of the present invention having a three-lens coupling optics.
Figure 3:
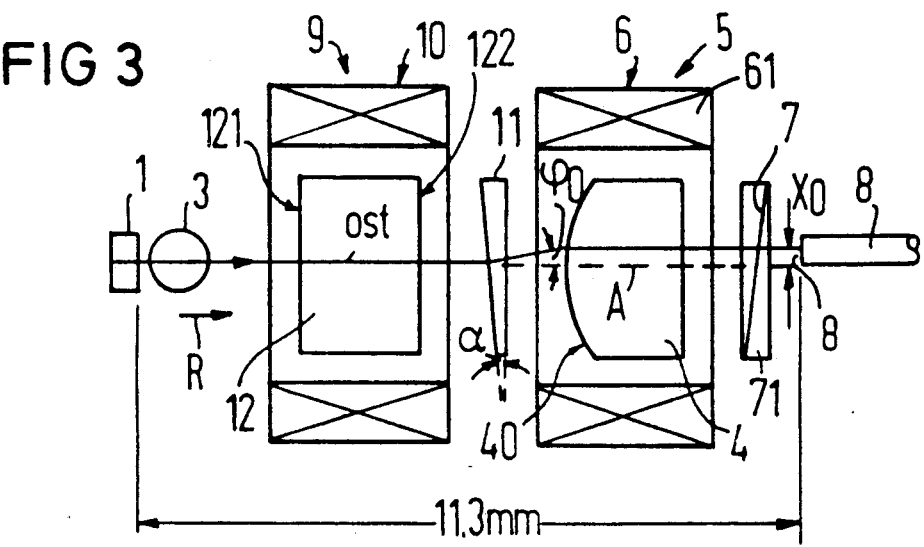
FIG. 3 is a schematic view of an arrangement of FIG. 1, wherein the second polarizer is composed of a camera wedge and the optical fiber is adjusted with a lateral displacement.

The principles of the present invention are particularly useful when incorporated in an arrangement, such as illustrated in FIGS. 1, 2 and 3. In all the illustrated arrangements, a linearly polarized laser emission, which is emitted divergently by a semiconductor laser 1 in the direction of arrow R is culminated by a first lens 3, for example a spherical lens composed of glass. The emission culminated by the first lens 3 is then focussed by a second lens 4 or by a third lens 12 and a second lens 4 (see FIG. 2) onto one end 81 of a fiber 8 that, for example, is a single-mode fiber.

Following one another in the propagation direction indicated by the arrow R of the laser emission between the first lens 3 and the end 81 of the fiber 8 are, first, a second optical isolator 9, and then a first optical isolator 5, which are arranged in the beam path of the laser emission. The first optical isolator 5 is composed of a first Faraday rotator 6 and of a first polarizer 7 arranged between the first Faraday rotator 6 and the fiber 8. The first Faraday rotator 6 will turn the polarization plane of the supplied, linearly polarized light by 45° and is composed of a plano-convex lens of ferrite, for example YIG, that forms the second lens 4. The second lens 4 has a convex side 40 which faces toward the semiconductor laser 1 and is surrounded by a ring magnet 61.

The first polarizer 7, for example, can be composed of a dielectrical multiple layer arranged at an angle obliquely relative to the propagation direction R. This layer is embedded in a block 71 of glass and, thus, can be composed of an interference polarizer.

The second optical isolator 9 is composed of a second Faraday rotator 10 and of a second polarizer 11, which is arranged between the second Faraday rotator 10 and the first isolator 5. The second Faraday rotator 10 is composed of a disc 12 of ferrite, for example YIG, that is surrounded by a ring magnet 101.

In the exemplary embodiment of FIG. 1, the disc 12 comprises parallel, planar flat surfaces 121 and 122, whereas the disc 12' in the exemplary embodiment of FIG. 2 is fashioned as a plano-convex lens, whose convex surface 123 faces toward the semiconductor laser 1.

In the exemplary embodiment of FIG. 2, the first lens 3 and the third lens 12', which is part of the second Faraday rotator 10, preferably forms a confocal system that does not directly image the laser spot onto the fiber, but it generates a large intermediate spot. The virtual spot that is matched to the intermediate spot is generated with the second lens 4 of the first Faraday rotator 6. The improvements of the adjustment tolerance is achieved by enlarging the fiber spot with the assistance of the virtual intermediate image.

The two Faraday rotators 6 and 10 are arranged so that each respectively rotates the plane of the linearly polarized light by 45° and, together, will rotate it by 90°.

Compared to the first polarizer 7, the second polarizer 11 must have a higher blocking attenuation so that the one polarizer 7 must satisfy the conditions that a polarizer must meet in a traditional single isolator (in this respect, see the previously-mentioned article by T. Chikama et al entitled "An Optical FSK Transmission Experiment Using Solitary DFB Lasers for Broad-Band Distributed Networks", *European Conf. of Optical Comm. (ECOC)* '87, Vol. I, pp. 349, September 1987). According to this condition, the transmissivity $\tau_1$ of the first polarizer 7 must be smaller for the linear polarized light that returns from the fiber 8 and must be cancelled out for a polarization component for which the polarizer 7 has a blocking effect than in the extinction ratio k of the ferrite material of the first Faraday rotator 6. The extinction ratio k of the ferrite materials defines that part that, by stress induced birefringence of the ferrite material, is scattered by the polarization component into the polarization plane that is orthogonical to this component. The other polarization component that is orthogonical to the one polarization component for which the first polarizer 7 has a blocking effect, passes through the first polarizer 7 unimpeded. The part defined by k is scattered by the other component into the polarization plane of the first polarization component. So that the light returning from the fiber 8 behind the first Faraday rotator 6 is not significantly greater than the part defined by k, the transmissivity $\tau_1$ must be less than k.

The second polarizer 11 has a blocking action for the other polarization component, whereas the one polarization component passes through unimpeded. Proceeding from the first Faraday rotator 6, the part defined by k and scattered by the other polarization component into the polarization plane of the first polarization component proceeds through the second polarizer 11 into the ferrite material of the second Faraday rotator 10. In this material, the part of the part defined by k and that which is defined by the extinction ratio k' of this ferrite material is scattered into the polarization plane of the other polarization component. A part that is defined by k·k' and that is produced by scattering into the ferrite material is, thus, obtained behind a second Faraday rotator 10 from the light power returning from the fiber 8. So that the light behind the second Faraday rotator 10 that returns from the fiber 8 is not greater than the light produced by the scattering in the ferrite material of the two rotators 6 and 10, the transmissivity $\tau_2$ of the second polarizer 11 for the other polarization component for which this polarizer 11 has a blocking effect must be less than k·k' with k<<1 and k'<<1. In accordance therewith, it is necessary that the second polarizer 11 has a higher blocking attenuation than the first polarizer 7, whereby the blocking attenuation that a polarizer must have in a traditional single isolator is adequate for the first polarizer 7. Given a extinction ratio for the YIG material having k= −37 dB, $\tau_2$ < −74 must apply.

Given proper dimensioning of the two polarizers, the light feedback in the TE mode of the semiconductor laser given a YIG material is attenuated by the factor $k^2 = -74$ dB, whereas it is suppressed only by the factor k= −37 dB, given a single isolator.

Since the first polarizer 7 advantageously need only satisfy the demands of a single isolator, all isolator standards therein can be employed, for example, interference polarizers or a lamina of birefringent material, for example of calcite.

The second polarizer 11 is located in the culminator beam path between two lenses. In this region, the spot radius of the emission is large in comparison to the wavelength. A slight angular deflection of the reflected Gauss emission is adequate here so that only weak feedback into the laser occurs. For example, interference polarizers, Rochon-polarizers or birefringent wedges, as well, come into consideration as polarizers that generate an angular deflection.

Interference polarizers are, in fact, cost-beneficial and are simple to manufacture; however, they have too low a blocking attenuation of more than −40 dB. Even when two such polarizers are arranged in series, the blocking attenuation is no better than −40 dB. Excessively high transmission losses occur when three interference polarizers are connected following one another.

Rochon-polarizers and comparable polarizers of this species are compact and, indeed, have an excellent blocking behavior; however, their manufacture is extremely involved. Birefringent wedges having different meridional sections must be joined together. The high manufacturing outlay leads to a correspondingly high unit price.

Birefringent wedges result in considerable lower cost and have an adequately high blocking attenuation. In their case, ordinary and extraordinary rays are separated from one another by angular deflection of different degrees. The sole disadvantage comprises the undesirable angular deflection of the ordinary ray that is to be coupled to the fiber. It has been found that this disadvantage can be compensated by a suitable adjustment of the fiber 8 and that no coupling losses occur when the deflection angle of the ordinary ray is small.

In the embodiment of FIG. 3, the second polarizer 11 is composed of such a wedge of calcite.

In a concrete execution of the example of FIG. 3, the first lens 3 is composed of a spherical lens of glass having a focal length $f_1 = 0.55$ nm. The wedge of calcite has a wedge angle $\alpha = 2.81°$. This wedge deflects the ordinary rays ost by an angle $\phi_0 = 1.34°$ and the angular difference $\Delta\phi$ between the deflected, ordinary ray ost and the deflected, extraordinary ray amounts to 0.45°. The second lens 4 has a focal length $f_2 = 2.5$ nm. The ordinary ray ost deflected by the angle $\phi_0$ is transformed by the second lens 4 into a ray that is parallel to the optical axis A of the arrangement, but that is offset relative to this axis A by $x_0 = f_2 \cdot \tan \phi_0 = 58.6$ μm. This axial offset $x_0$ is compensated by a corresponding axial offset of the fiber 8 out of the axis A. This concrete execution has a blocking attenuation of at least −74 dB.

Because the thickness of the wedge plays no role, this polarizer 11 can be executed extremely thin, for example 0.5 mm. This contributes to an advantageous structural length for the arrangement that amounts to less than 12 mm.

A polarizer 11 in the form of a wedge of birefringent material can also be employed in the embodiment of FIG. 2.

An inventive arrangement works in the following way: The laser emission that is divergently emitted by the semiconductor laser 1 and that, for example, is linearly polarized in the TE mode is culminated by the first lens 3 and impinges the second Faraday rotator 10 that turns the polarization plane of the linearly polarized light by 45°. The second polarizer 11 is set so that it is transmissive for the light polarized in this plane so that this light proceeds unimpeded through this polarizer 11 to the first Faraday rotator 6 that, in turn, will rotate the polarization plane of the supplied, linear polarized light by 45° so that the polarization plane of the light emerging from this first rotator 6 is turned by 90° in comparison to the polarization plane of the original TE mode. The first polarizer 7 is set so that it is transmissive for the light polarized in this plane so that it passes unimpeded through the first polarizer 7 and proceeds to the fiber 8 onto whose end 81 it is focussed by the second lens 4.

Due to a slight birefringence within the fiber 8, the light returning from the fiber can assume an arbitrary polarization condition that can be divided into two mutually orthogonally polarization components whereof a first component is polarized in the plane that is rotated by 90° relative to the polarization plane of the original TE mode and whereof the second component oscillates in and to the polarization plane of the original TE mode.

The first component passes unimpeded through the first polarizer 7 and proceeds into the first Faraday rotator 6 that turns the polarization plane of this first component by 45°. The first polarizer 7 has a blocking effect for the second component, i.e., only the lower power part of the second component defined by the lower transmissivity $\tau_1$ of the second polarizer 7 proceeds to the Faraday rotator 6 that also turns the polarization plane of this part by 45°. Moreover, a power part of the first component defined by the extinction ratio $k < 1$ of the ferrite material of the first Faraday rotator 7 is scattered into the polarization plane that is perpendicular to the polarization plane of this component so that what proceeds to the second polarizer 11 is the first component that is slightly reduced in optical power by the scattered light and that has a polarization plane turned by 45° and a slight power part of the second component, whose polarization plane is perpendicular to the polarization plane of the first component that is turned by 45°. Since $\tau_1 < k$ is selected, the slight power part of the second component that has proceeded to the second polarizer 11 is essentially defined by k.

The slight power part of the second component passes unimpeded through the second polarizer 11 and proceeds to the second Faraday rotator 10 that turns the polarization plane of this component by 45° and that scatters a power part of the second component that is defined by the extinction ratio $k' < 1$ of its ferrite material into the plane that is perpendicular to the polarization plane of this component.

The second polarizer 11 has a blocking effect for the first component having a polarization plane turned by 45°, i.e., only a slight power part of this first component defined by the low transmissivity $\tau_2$ of the second polarizer 11 will proceed behind the second Faraday rotator 10 that also turns the polarization plane of this part by 45°.

What, thus, proceeds to the first lens 3 is the second component, whose light power is slightly diminished by the scattered light and whose polarization plane behind the second Faraday rotator 10 is particular to the polarization plane of the original TE mode and whose slight light power is essentially defined by $k < 1$, as well as a slight power part of the first component that oscillates behind the second Faraday rotator 10 in the polarization plane of the original TE mode. Since $\tau_2 < k \cdot k'$ applies, the power part of the first component proceeds to the first lens 3 is essentially defined by $k \cdot k' << k$.

Although various minor modifications may be suggested by those versed in the art, it should be understood that we wish to embody within the scope of the patent granted hereon all such modifications as reasonably and properly come within the scope of our contribution to the art.

We claim:

1. An optical arrangement for a feedback-free coupling of a laser emission divergently emitted by a semiconductor laser into an optical fiber, said arrangement including a first optical lens for receiving the laser emission, a second optical lens arranged following the first lens in the propagation direction of the laser emission and a first optical isolator being arranged in a beam path of the laser emission, said first optical isolator being composed of a Faraday rotator and at least a first polarizer, wherein the second lens being a component part of the Faraday rotator, the improvements comprising a second optical isolator being arranged between the first lens and the first optical isolator, said second optical isolator being composed of a second Faraday rotator and of a second polarizer that has a higher blocking attenuation than a blocking attenuation of the first polarizer.

2. In an optical arrangement according to claim 1, wherein the second polarizer is composed of a wedge of a birefringent material.

3. In an optical arrangement according to claim 1, which includes a third optical lens being arranged in the second Faraday rotator.

4. In an optical arrangement according to claim 3, wherein the second polarizer is composed of a wedge of birefringent material.

5. In an optical arrangement according to claim 3, wherein the third lens is a plano-convex lens.

6. In an optical arrangement according to claim 5, wherein the second polarizer is composed of a wedge of birefringent material.

* * * * *